(12) United States Patent
Ye et al.

(10) Patent No.: US 12,412,599 B2
(45) Date of Patent: Sep. 9, 2025

(54) IMAGE PROCESSING METHOD AND APPARATUS, AND DEVICE AND MEDIUM

(71) Applicant: Beijing Zitiao Network Technology Co., Ltd., Beijing (CN)

(72) Inventors: Xinjing Ye, Beijing (CN); Junsheng Wu, Beijing (CN); Haitao Lv, Beijing (CN); Xi Gao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/089,377

(22) Filed: Dec. 27, 2022

(65) Prior Publication Data

US 2023/0133416 A1 May 4, 2023

Related U.S. Application Data

(63) Continuation of application No. PCT/CN2022/075622, filed on Feb. 9, 2022.

(30) Foreign Application Priority Data

Feb. 9, 2021 (CN) .......................... 202110180571.8

(51) Int. Cl.
G11B 27/031 (2006.01)
G06T 7/20 (2017.01)
G06T 7/70 (2017.01)

(52) U.S. Cl.
CPC .............. *G11B 27/031* (2013.01); *G06T 7/20* (2013.01); *G06T 7/70* (2017.01); *G06T 2207/10016* (2013.01)

(58) Field of Classification Search
None
See application file for complete search history.

(56) References Cited

U.S. PATENT DOCUMENTS 9,383,894 B2 * 7/2016 Schwesinger .......... G06F 3/017
10,896,534 B1 1/2021 Smith et al.
(Continued)

FOREIGN PATENT DOCUMENTS

CN 102609970 A 7/2012
CN 106303291 A 1/2017
(Continued)

OTHER PUBLICATIONS

Xiao, Jun et al., "Computer Vision and Machine Learning in 3D Human Animation: a Survery", Journal of Computer-Aided Design and Computer Graphics, vol. 20, No. 3, Mar. 31, 2008, pp. 282-290. (English Abstract Provided).
(Continued)

*Primary Examiner* — Gelek W Topgyal
(74) *Attorney, Agent, or Firm* — Astute IP Law Group

(57) ABSTRACT

An image processing method and apparatus, and a device and a medium are provided. The image processing method comprises: determining a motion state of a first recognition object in an initial video image; determining a motion state of a material object according to the motion state of the first recognition object; if the motion state of the material object is a first state, synthesizing the material object and a first-style video image according to the motion state of the material object, to obtain a first target video image; and if the motion state of the material object is a second state, synthesizing the material object and a second-style video image according to the motion state of the material object, to obtain a second target video image. The first-style video image and the second-style video image are images of different styles obtained from the initial video image.

18 Claims, 5 Drawing Sheets

(56) References Cited

U.S. PATENT DOCUMENTS

| | | |
|---|---|---|
| 2008/0030459 A1 | 2/2008 | Kouno |
| 2009/0263023 A1 | 10/2009 | Iwamoto |
| 2013/0346588 A1 | 12/2013 | Zhang et al. |
| 2016/0366396 A1* | 12/2016 | Kim .................. G06T 7/194 |
| 2019/0019031 A1 | 1/2019 | Yun et al. |
| 2019/0102366 A1 | 4/2019 | Li et al. |
| 2021/0058564 A1 | 2/2021 | Yuan et al. |
| 2021/0295602 A1* | 9/2021 | Scapel ................. G06T 19/006 |
| 2022/0070385 A1* | 3/2022 | Van Os ............ H04M 1/72439 |
| 2022/0101613 A1* | 3/2022 | Rockel ................... G06F 3/011 |
| 2022/0156999 A1* | 5/2022 | Assouline ................ G06T 7/20 |
| 2022/0189094 A1* | 6/2022 | Zhang ................. G06V 40/23 |
| 2023/0021533 A1* | 1/2023 | Zhang ................. G11B 27/102 |
| 2023/0115094 A1* | 4/2023 | Zhu ........................ G06T 7/194 |
| | | 345/473 |

FOREIGN PATENT DOCUMENTS

| | | | | |
|---|---|---|---|---|
| CN | 106373170 A | | 2/2017 | |
| CN | 106484416 A | | 3/2017 | |
| CN | 107105173 A | | 8/2017 | |
| CN | 107911614 A | * | 4/2018 | ............. G06F 3/017 |
| CN | 107944397 A | | 4/2018 | |
| CN | 108234903 A | | 6/2018 | |
| CN | 108289180 A | | 7/2018 | |
| CN | 108712661 A | | 10/2018 | |
| CN | 108810597 A | | 11/2018 | |
| CN | 108829893 A | | 11/2018 | |
| CN | 109495695 A | | 3/2019 | |
| CN | 110012237 A | | 7/2019 | |
| CN | 110139159 A | | 8/2019 | |
| CN | 110189246 A | * | 8/2019 | ........... G06T 3/0012 |
| CN | 107911614 B | | 9/2019 | |
| CN | 110381266 A | | 10/2019 | |
| CN | 111145088 A | | 5/2020 | |
| CN | 111353071 A | | 6/2020 | |
| CN | 111416991 A | | 7/2020 | |
| CN | 111783729 A | | 10/2020 | |
| CN | 111951157 A | | 11/2020 | |
| CN | 112199526 A | | 1/2021 | |
| CN | 112311966 A | | 2/2021 | |
| CN | 112906553 A | | 6/2021 | |
| JP | 2005261642 A | | 9/2005 | |
| JP | 2006014875 A | | 1/2006 | |
| JP | 4695275 B2 | | 6/2011 | |
| WO | 2007138858 A1 | | 12/2007 | |
| WO | 2020248767 A1 | | 12/2020 | |

OTHER PUBLICATIONS

International Search Report issued in International Patent Application No. PCT/CN2022/075622 on Apr. 20, 2022.
Notice of Allowance for Japanese Patent Application No. 2023-548283, mailed Mar. 5, 2024, 5 pages.
Extended European Search Report for European Patent Application No. 22752274.5, mailed on Aug. 14, 2023, 6 pages.
International Search Report and Written Opinion for PCT/CN2021/117199, mailed on Dec. 17, 2021, 14 pages.

* cited by examiner

IMAGE PROCESSING METHOD AND APPARATUS, AND DEVICE AND MEDIUM

This application is a continuation application of International Application No. PCT/CN2022/075622, filed on Feb. 9, 2022, which claims the priority to Chinese Patent Application No. 202110180571.8 titled "IMAGE PROCESSING METHOD AND APPARATUS, AND DEVICE AND MEDIUM", filed on Feb. 9, 2021 with the China National Intellectual Property Administration, both of which are incorporated herein by reference in their entireties.

FIELD

The present disclosure relates to the field of Multimedia Technology, and in particular, to an image processing method and apparatus, a device, a medium and a program product.

BACKGROUND

With the rapid development of computer technology and mobile communication technology, various video platforms based on electronic devices have been widely used, greatly enriching people's daily life. More and more users are willing to share their video works on the video platform for other users to watch.

When making a video, a user first need to perform some complex material editing operations, and then perform video editing operations on the edited material to finally generate a video work. If the user is not good at material editing, the time cost of video production will be high, and the quality of the video works cannot be guaranteed, lowering the user experience.

SUMMARY

In order to solve the above technical problems or at least partially solve the above technical problems, the present disclosure provides an image processing method, an apparatus, a device, a medium and a computer program product.

In a first aspect, an image processing method is provided in the present disclosure, and the method includes:
determining a motion state of a first recognition object in an initial video image;
determining a motion state of a material object according to the motion state of the first recognition object;
if the motion state of the material object is a first state, synthesizing the material object with a first styled video image according to the motion state of the material object, so as to obtain a first target video image; and
if the motion state of the material object is a second state, synthesizing the material object with a second styled video image according to the motion state of the material object, so as to obtain a second target video image;
wherein the first styled video image and the second styled video image are images of different styles that are obtained on the basis of the initial video image.

In a second aspect, an image processing apparatus is provided in the present disclosure, and the apparatus includes:
a first processing unit, configured to determine a motion state of a first recognition object in an initial video image;
a second processing unit, configured to determine a motion state of a material object according to the motion state of the first recognition object;
a first synthesizing unit, configured to, if the motion state of the material object is a first state, synthesize the material object with a first styled video image according to the motion state of the material object so as to obtain a first target video image; and
a second synthesizing unit, configured to, if the motion state of the material object is a second state, synthesize the material object with a second styled video image according to the motion state of the material object so as to obtain a second target video image;
wherein the first styled video image and the second styled video image are images of different styles that are obtained on the basis of the initial video image.

In a third aspect, an image processing device is provided in the present disclosure, and the device includes:
a processor; and
a memory for storing executable instructions;
wherein the processor is configured to read the executable instructions from the memory and execute the executable instructions to implement the image processing method according to the first aspect of the present disclosure.

In a fourth aspect, a computer-readable storage medium, wherein the computer-readable storage medium stores a computer program, and when the computer program is executed by a processor, the processor implements the image processing method according to the first aspect of the present disclosure.

In a fifth aspect, a computer program product, wherein when the computer program product runs on a computer, the computer executes the image processing method according to the first aspect of the present disclosure.

Compared with the conventional technology, the technical solution provided in the embodiments of the present disclosure has the following advantages.

In the image processing method, apparatus, device and medium according to the embodiments of the present disclosure, the motion state of the first recognition object in the initial video image is determined, the motion state of the material object is determined according to the motion state of the first recognition object, and then the motion state of the material object is to be judged. If the motion state of the material object is the first state, the material object is synthesized with the first styled video image according to the motion state of the material object to obtain the first target video image. If the motion state of the material object is the second state, the material object is synthesized with the second styled video image according to the motion state of the material object to obtain the second target video image. Therefore, the initial video image which is used as video material is automatically edited to obtain the edited composite image without users' manual edit for the material, thus reducing the time cost of video production, improving the quality of video works, and improving users' experience.

BRIEF DESCRIPTION OF THE DRAWINGS

The above and other features, advantages and aspects of the embodiments of the present disclosure will become more apparent in combination with the accompanying drawings and with reference to the following embodiments. Throughout the drawings, the same or similar reference numbers represent the same or similar elements. It should be understood that the drawings are schematic and that the originals and elements are not necessarily drawn to scale.

DETAILED DESCRIPTION

Figure 1:
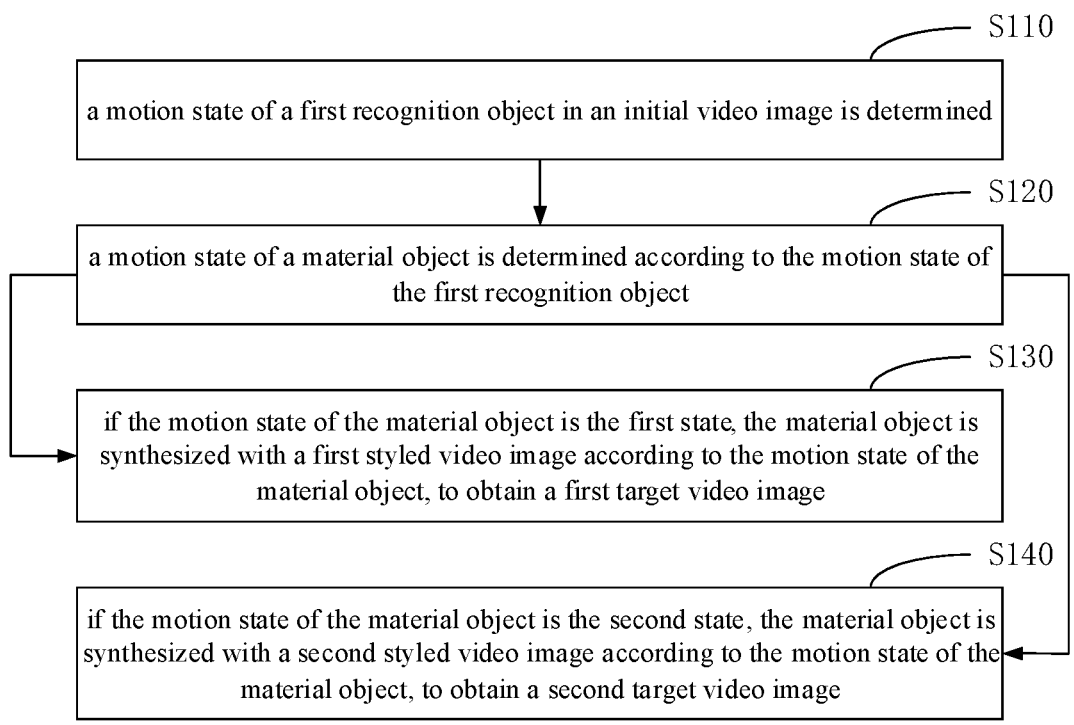
FIG. 1 is a flow diagram of an image processing method according to an embodiment of the present disclosure.

Embodiments of the present disclosure will be described in more detail below with reference to the accompanying drawings. Although some embodiments of the present disclosure are shown in the accompanying drawings, it should be understood that the present disclosure may be implemented in various forms, and should not be interpreted as limited to the embodiments described herein. Instead, these embodiments are provided for a more thorough and complete understanding of the present disclosure. It should be understood that the drawings and embodiments of the present disclosure are only for illustrative purposes and are not intended to limit the scope of protection of the present disclosure.

It should be understood that the steps recorded in the method embodiments of the present disclosure may be executed in different order and/or in parallel. Further, the method embodiments may include additional steps and/or omit to perform the steps shown. The scope of the present disclosure is not limited in this respect.

The term "including" and its variants used herein are open including, that is, "including but not limited to". The term "based on" is "at least partially based on". The term "one embodiment" means "at least one embodiment". The term "another embodiment" means "at least one other embodiment". The term "some embodiments" means "at least some embodiments". Other terms are defined in the following description.

It should be noted that the wording "first", "second" and the like in the present disclosure are only used to distinguish different apparatuses, modules or units, and are not used to define the order or interdependence of functions performed by these apparatuses, modules or units.

It should be noted that the wording of "one" and "many" in this disclosure is schematic rather than restrictive, and those skilled in the art should understand that, unless otherwise explicitly pointed out in the context, it should be understood as "one or more".

The names of messages or information interacted between multiple apparatuses in the embodiments of the present disclosure are only used for illustrative purposes, and are not used to limit the scope of these messages or information.

In conventional technology, when making a video, a user first need to perform some complex material editing operations, and then perform video editing operations on the edited material to finally generate a video work. If the user is not good at material editing, the time cost of video production will be high, and the quality of the video works cannot be guaranteed, lowering the user experience.

To solve the above problems, the embodiments of the present disclosure provide an image processing method, an apparatus, a device and a medium that can automatically edit video materials.

An image processing method according to an embodiment of the present disclosure is described with reference to FIG. 1.

In some embodiments of the present disclosure, the image processing method may be performed by an electronic device. The electronic devices may include a mobile phone, a tablet, a desktop, a laptop, an in-vehicle terminal, a wearable electronic device, an all-in-one computer, a smart home device and other device with communication functions, or a virtual machine, or a device simulated by a simulator.

FIG. 1 is a flow diagram of an image processing method according to an embodiment of the present disclosure.

As shown in FIG. 1, the image processing method includes the following steps.

In step S110, a motion state of a first recognition object in an initial video image is determined.

In an embodiment of the present disclosure, the electronic device may, after obtaining the initial video image, perform motion analysis on the first recognition object in the initial video image based on an object detection method, and determine the motion state of the first recognition object.

In some embodiments, the initial video image may be a video image in a video that has been captured. For example, the initial video image may be a video locally stored by the electronic device, a video sent by other electronic devices, or a video image on the Internet.

In other embodiments, the initial video image may be a video image captured in real time by the electronic device.

In an embodiment of the present disclosure, when the initial video image is the video image captured in real time by the electronic device, the virtual world and the real world may be combined on a screen based on Augmented Reality (AR) technology to realize the material editing of video materials, so as to achieve the interaction with users.

In an embodiment of the present disclosure, the first recognition object may be preset according to actual needs, and the present disclosure is not limited herein.

In some embodiments, the first recognition object may include any one of a person, an animal or a thing.

Taking the case that the first recognition object is a person as an example, the motion state of the first recognition object may refer to an overall motion state of the person.

In other embodiments, the first recognition object may include any body part.

Taking the case that the first recognition object is a hand as an example, the motion state of the first recognition object may refer to the motion state of the hand.

In an embodiment of the present disclosure, a motion type of the motion state of the first recognition object may be preset according to actual needs, and the present disclosure is not limited herein.

In an embodiment of the present disclosure, the motion state of the first recognition object may include any one of the following: a moving state of the first recognition object along a target moving direction; a posture change state of the first recognition object towards a target object posture; and a rotation state of the first recognition object along a target rotation direction.

In some embodiments, the target moving direction may be preset according to actual needs, and is not limited here. For example, the target moving direction may be a depth direction at any angle in the video image. For another example, the target moving direction may be a direction at any angle in the plane of the video image.

In these embodiments, the moving state along the target moving direction may include a moving distance along the target movement direction.

When the target object is the hand and the target moving direction is the depth direction perpendicular to the video image, the motion state of the first recognition object may be the moving distance of the hand in the depth direction perpendicular to the video image.

In other embodiments, the target object posture may be preset according to actual needs, and the present disclosure is not limited herein.

In these embodiments, the posture change state towards the target object posture may include the amount of posture change towards the target object posture.

When the target object is the hand and the target object posture is a palm open posture, the motion state of the first recognition object may be the amount of posture change toward the palm open posture.

In other embodiments, the target rotation direction may be preset according to actual needs, and the present disclosure is not limited herein.

For example, the target rotation direction may be clockwise or counterclockwise at any angle in the depth direction of the video image. For another example, the target direction may be clockwise or counterclockwise in the plane of the video image.

In these embodiments, the rotation state along the target rotation direction may include a rotation angle in the target rotation direction.

When the target object is the hand and the target rotation direction is clockwise in the plane of the video image, the motion state of the first recognition object may be a rotation angle of the hand in the plane of the video image.

In step S120, a motion state of a material object is determined according to the motion state of the first recognition object.

In an embodiment of the present disclosure, after determining the motion state of the first recognition object, the electronic device may determine the motion state of the material object under the motion state of the first recognition object.

In an embodiment of the present disclosure, the motion state of the material object may be a change state of position relationship of the material object relative to a second recognition object.

The motion state of the material object may be preset according to actual needs, and the present disclosure is not limited herein. For example, the motion state of the material object may include any one of the following: a change state of an included angle between the material object and the second recognition object in a target tilt direction, a layer change state relative to the second recognition object, and a position change state relative to the second recognition object in an image plane.

The second recognition object may be preset according to actual needs, and the present disclosure is not limited herein. For example, the second recognition object may be an image subject such as a person or an animal.

In some embodiments, the target tilt direction may be preset according to actual needs, and the present disclosure is not limited herein. For example, the target tilt direction may be the depth direction at any angle in the video image. For another example, the target tilt direction may be a direction at any angle in the plane of the video image.

In these embodiments, a state of the included angle between the material object and the second recognition object in the target tilt direction may include an angle between the material object and the second recognition object in the target tilt direction.

In other embodiments, a layer state relative to the second recognition object may include a layer position relative to the second recognition object.

For example, the layer position relative to the second recognition object may include a foreground or a background of the second recognition object.

In some embodiments, a position state relative to the second recognition object in the image plane may include a relative distance relative to the second recognition object in the image plane.

In an embodiment of the present disclosure, the material object may be preset according to actual needs, and the present disclosure is not limited herein.

For example, the material object may be special effect of scene decorations. For another example, the material object may be special effect of greeting card decorations.

In some embodiments, the material object may include a moving material object. At this time, the motion state of the material object may be the motion state of the moving material object.

For example, the moving material object may include special effect of movable greeting card frame.

Taking the case that the moving material object is the special effect of greeting card frame and the second recognition object is a person as an example, if the motion state of the material object is an angle between the special effect of greeting card frame and the person when the special effect of greeting card frame tilting to the depth direction perpendicular to the video image, the angle between the special effect of greeting card frame and the person changes with the movement of the first recognition object, which can achieve the effect of the greeting card frame falling down and standing up.

Taking the case that the moving material object is the special effect of greeting card frame and the second recognition object is a person as an example, if the motion state of the material object is the layer position relative to the second recognition object, the special effect of greeting card frame may be switched from the foreground of the person to the background of the person with the movement of the first recognition object, or from the background of the person to the foreground of the person.

In other embodiments, in order to further improve the aesthetics of the edited video material, the material object may include a moving material object and a fixed material object. The motion state of the material object may be the motion state of the moving material object. The fixed material object is displayed in a constant preset display state without any motion.

For example, the moving material object may include movable special effect of greeting card frame, and the fixed material object may include non-movable special effect of greeting card frame.

In the embodiment of the present disclosure, after determining the motion state of the material object, the electronic device may judge the motion state of the material object. If the motion state of the material object is the first state, step S130 is executed, and if the motion state of the material object is the second state, step S140 is executed.

In step S130, if the motion state of the material object is the first state, the material object is synthesized with a first styled video image according to the motion state of the material object, to obtain a first target video image.

In an embodiment of the present disclosure, the first state may indicate that the material object and the second recognition object in the initial video image meet a first position relationship.

When the motion state of the material object is that there is an included angle between the material object and the second recognition object in the target tilt direction, the first position relationship may be specifically that the change of the included angle falls into a first angle range, or the first relationship may be specifically that the included angle keeps within the first angle range during the change process.

Taking the case that the target tilt direction is the depth direction perpendicular to the video image as an example, the first position relationship may specifically be that the included angle falls within the range of [0, 45] in the depth direction perpendicular to the video image.

When the motion state of the material object is the layer position relative to the second recognition object, the first position relationship may be specifically that the material object is located in the foreground of the second recognition object.

When the motion state of the material object is that the material object is at a distance from the second recognition object in the image plane, the first position relationship may specifically be that a change of the distance falls into a first distance range, or the distance keeps within the first distance range during the change process.

Therefore, when the electronic device determines that the motion state of the material object is the first state, the first styled video image corresponding to the initial video image is obtained, and then the material object is synthesized with the first styled video image according to the motion state of the material object to obtain the first target video image corresponding to the first state.

In an embodiment of the present disclosure, the first styled video image may be a video image with a first style obtained based on the initial video image, and the first style corresponds to the first state.

In step S140, if the motion state of the material object is the second state, the material object is synthesized with a second styled video image according to the motion state of the material object, to obtain a second target video image.

In an embodiment of the present disclosure, the second state may indicate that the material object and the second recognition object in the initial video image meet a second position relationship.

When the motion state of the material object is that there is the included angle between the material object and the second recognition object in the target tilt direction, the second position relationship may be specifically that the change of the included angle falls into a second angle range, or the second relationship may be specifically that the included angle keeps within the second angle range during the change process.

Taking the case that the target tilt direction is the depth direction perpendicular to the video image as an example, the second position relationship may specifically be that the included angle falls within the range of (45, 90] in the depth direction perpendicular to the video image.

When the motion state of the material object is the layer position relative to the second recognition object, the second position relationship may be specifically that the material object is located in the background of the second recognition object.

When the motion state of the material object is that the material object is at a distance from the second recognition object in the image plane, the second position relationship may specifically be that the change of the distance falls into a second distance range, or the distance keeps within the second distance range during the change process.

Therefore, when the electronic device determines that the motion state of the material object is the second state, the second styled video image corresponding to the initial video image is obtained, and then the material object is synthesized with the second styled video image according to the motion state of the material object to obtain the second target video image corresponding to the second state.

In an embodiment of the present disclosure, the second styled video image may be a video image with a second style obtained based on the initial video image, and the second style corresponds to the second state.

Further, the first styled video image and the second styled video image are images of different styles that are obtained on the basis of the initial video image, that is, the first style is different from the second style.

In the embodiments of the present disclosure, the motion state of the first recognition object in the initial video image is determined, the motion state of the material object is determined according to the motion state of the first recognition object, and then the motion state of the material object is to be judged. If the motion state of the material object is the first state, the material object is synthesized with the first styled video image according to the motion state of the material object to obtain the first target video image. If the motion state of the material object is the second state, the material object is synthesized with the second styled video image according to the motion state of the material object to obtain the second target video image. Therefore, the initial video image which is used as video material is automatically edited to obtain an edited composite image without manual material edit of users, thus reducing the time cost of video production, improving the quality of video works, and improving users' experience.

In an embodiment of the present disclosure, in order to accurately determine the motion state of the first recognition object, the step S110 may specifically include the following steps.

In step S111, a display parameter variation of the first recognition object in the initial video image is detected.

When the initial video image is the start frame in video, it is determined that the display parameter variation of the first recognition object is zero.

When the initial video image is a non-start frame in video, a reference video image which is previous and adjacent to the initial video image may be obtained.

In this case, the electronic device may detect the first display parameter of the first recognition object in the initial video image and a second display parameter of the first recognition object in the reference video image based on object detection, and then subtract the second display parameter from the first display parameter to obtain the display parameter variation of the first recognition object.

The parameter types of the first display parameter and the second display parameter may be the parameter types preset according to actual needs for calculating the motion state of the first recognition object, and are not limited here.

In an embodiment, the display parameters may include at least one of following: an object posture of the first recognition object, a display size of the first recognition object, a display position of the first recognition object in the video image, and a distance between the first recognition object and a third recognition object.

The third identification object may be a position reference object pre-selected according to actual needs, and the present disclosure is not limited herein. For example, when the first recognition object is a hand, the third recognition object may be a head.

Taking the case that the motion state of the first recognition object is the moving distance of the hand in the depth direction perpendicular to the video image as an example, the display parameter may be the display size of the hand, the first display parameter may be the first display size of the hand in the initial video image, and the second display parameter may be the second display size of the hand in the reference video image, and then the second display size is subtracted from the first display size, thus the display parameter variation of the first recognition object is obtained.

In step S112, the motion state of the first recognition object is determined according to the display parameter variation.

In an embodiment of the disclosure, the electronic device may take the display parameter variation as the motion state of the first recognition object.

Taking the case that the motion state of the first recognition object is the moving distance of the hand in the depth direction perpendicular to the video image, the first display parameter is the first display size of the hand in the initial video image, and the second display parameter is the second display size of the hand in the reference video image as an example, if the display parameter variation is greater than or equal to zero, the display parameter variation may be used as an approaching distance of the hand in the depth direction perpendicular to the video image; and if the display parameter variation is less than zero, the display parameter variation may be used as a leaving distance of the hand along the depth direction perpendicular to the video image.

Therefore, in the embodiments of the present disclosure, it is possible to reliably analyze the motion of the first recognition object by detecting the display parameter variation in the initial video image of the first recognition object, and then determine the motion state of the first recognition object In another embodiment of the present disclosure, the styled video images corresponding to different motion states of the material object are obtained in different manners.

In some embodiments of the present disclosure, the first styled video image may be obtained by performing style migration on the initial video image.

In an embodiment, before the step S130, the image processing method may include:
performing face stylization for the initial video image to obtain a stylized face image;
performing non-face stylization for the initial video image to obtain a stylized non-face image; and
synthesizing the stylized face image and stylized non-face image to obtain the first styled video image.

First, the electronic device may detect the face in the initial video image to obtain image of the face area in the initial video image, and input the image of the face area into a pre-trained face stylization model to obtain the stylized face image.

For example, the face stylization model may be a cartoon face conversion model, and the electronic device may input the face area image into the cartoon face conversion model to obtain the stylized face image of cartoon style.

Then, the electronic device may use a preset background stylization algorithm to perform non-face stylization on the non-face area of the initial video image to obtain stylized non-face image.

For example, the background stylization algorithm may be an Aoyi background conversion algorithm, and electronic device may use the Aoyi background conversion algorithm to perform non-face stylization on the non-face area of the initial video image, to obtain a stylized non-face image of cartoon style.

Finally, the electronic device may determine the relative position of the face area image in the initial video image, and then splice the stylized face image to the stylized non-face image at the relative position, to obtain the first styled video image.

In these embodiments, optionally, the step S130 of synthesizing the material object with the first styled video image according to the motion state of the material object to obtain the first target video image may specifically include:
superposing the material object with the first styled video image according to the motion state of the material object to obtain the first target video image.

When the material object includes the moving material object, the moving material object is directly superposed with to the first styled video image at a specified position according to the motion state of the moving material object, to obtain the first target video image.

When the material object includes the moving material object and the fixed material object, the moving material object is directly superposed with the first styled video image at the specified position according to the motion state of the moving material object, and the fixed material object is superposed with the first styled video image according to the preset display state, to obtain the first target video image.

In other embodiments of the disclosure, the second styled video image may be the initial video image.

Further, before the step S140, the image processing method may include: taking the initial video image as the second styled video image.

Specifically, the electronic device may directly take the initial video image as the second styled video image, so that the second styled video image is the initial video image with the original image style.

Therefore, in the embodiments of the present disclosure, different styled video images corresponding to the initial video image may be obtained through different stylizations to further improve the fun in interaction.

In an embodiment, the step S140 of synthesizing the material object with the second styled video image according to the motion state of the material object to obtain the second target video image may specifically include the following steps.

First, the second styled video image is segmented to obtain the image of the second recognition object and the background image other than the image of the second recognition object in the second styled video image, and then the material object is superposed with the image of the second recognition object and the background image based on the motion state of the material object, to obtain the second target video image.

When the material object includes the moving material object, the moving material object is directly superposed to the specified positions in the image of the second recognition object and the background image according to the motion state of the moving material object, to obtain the second person target video image.

When the material object includes the moving material object and the fixed material object, the moving material object is directly superposed to the specified positions in the image of the second recognition object and the background image in the motion state of the moving material object, and the fixed material object is superposed with the image of the second recognition object and the background image in the preset display state, to obtain the second target video image.

In order to improve the fun in interaction, the embodiments of the present disclosure further provides another image processing method, which will be described below with reference to FIG. 2.

In some embodiments of the present disclosure, the image processing method may be performed by an electronic device. The electronic devices may include a mobile phone, a tablet, a desktop, a laptop, an in-vehicle terminal, a wearable electronic device, an all-in-one computer, a smart home device and other device with communication functions, or a virtual machine, or a device simulated by a simulator.

Figure 2:
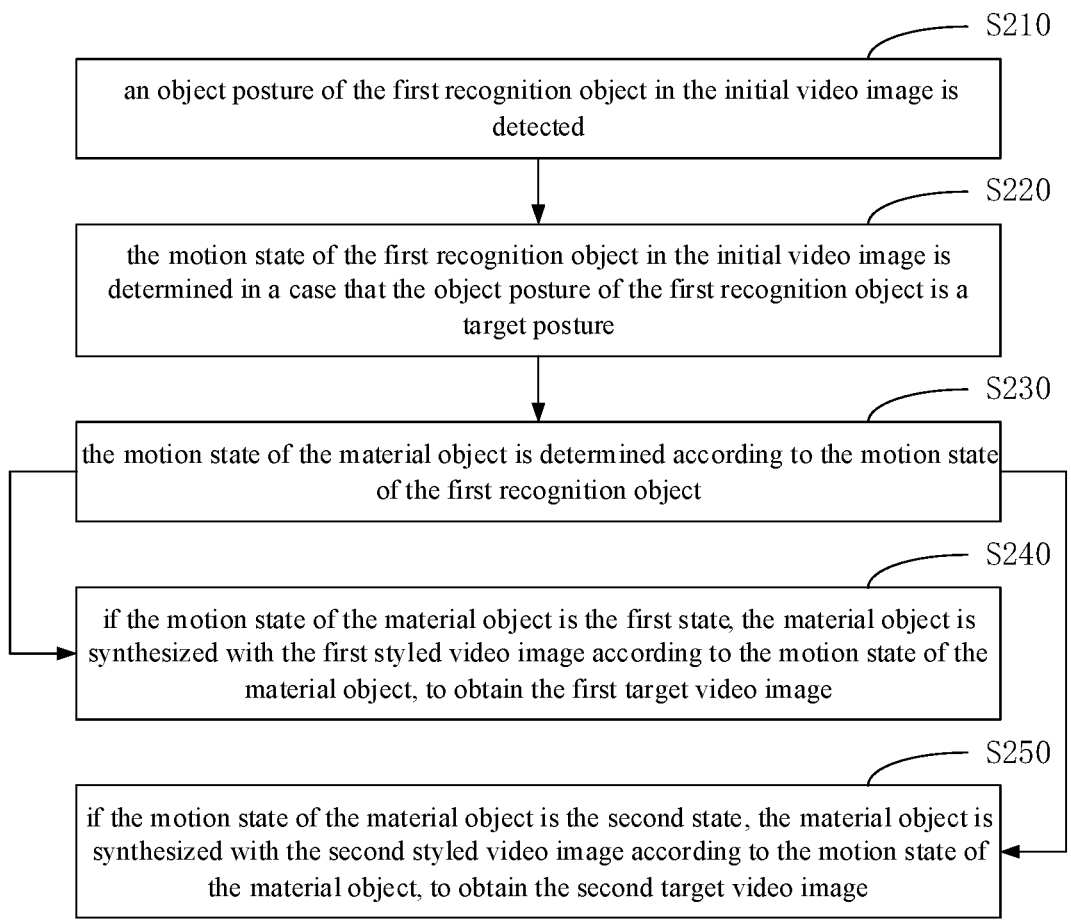
FIG. 2 is a flow diagram of an image processing method according to another embodiment of the present disclosure.

FIG. 2 is a flow diagram of an image processing method according to another embodiment of the present disclosure.

As shown in FIG. 2, the image processing method includes the following steps.

In step S210, an object posture of the first recognition object in the initial video image is detected.

In an embodiment of the present disclosure, after obtaining the initial video image, the electronic device may detect the object posture of the first recognition object in the initial video image based on the object detection method.

The initial video image has been described in step S110 shown in FIG. 1, and will not be described here.

In step S220, the motion state of the first recognition object in the initial video image is determined in a case that the object posture of the first recognition object is a target posture.

In an embodiment of the present disclosure, the electronic device may first determine the object posture of the first recognition object. If the object posture of the first recognition object is the target posture, the motion state of the first recognition object in the initial video image is determined. Otherwise, the initial video image is not processed.

In an embodiment of the present disclosure, the target posture may be preset according to actual needs, and the present disclosure is not limited herein. For example, the target object may be a hand, and the target posture may be a palm open posture.

The specific method for determining the motion state of the first recognition object is similar to step S110 shown in FIG. 1, and will not be described here.

In step S230, the motion state of the material object is determined according to the motion state of the first recognition object.

In and embodiment of the present disclosure, after determining the motion state of the material object, the electronic device may judge the motion state of the material object. If the motion state of the material object is the first state, step S240 is executed, and if the motion state of the material object is the second state, step S250 is executed.

In step S240, if the motion state of the material object is the first state, the material object is synthesized with the first styled video image according to the motion state of the material object, to obtain the first target video image.

In step S250, if the motion state of the material object is the second state, the material object is synthesized with the second styled video image according to the motion state of the material object, to obtain the second target video image.

The first styled video image and the second styled video image are images of different styles that are obtained on the basis of the initial video image.

Steps S230 to S250 are similar to steps S120 to S140 shown in FIG. 1, and will not be described here.

Therefore, in the embodiments of the present disclosure, the initial video image may be edited on the premise that the first recognition object is in a specified posture, which further improves the fun in interaction.

In order to improve the efficiency in material editing, the embodiments of the present disclosure further provide another image processing method, which will be described below with reference to FIG. 3.

In some embodiments of the present disclosure, the image processing method may be performed by an electronic device. The electronic devices may include a mobile phone, a tablet, a desktop, a laptop, an in-vehicle terminal, a wearable electronic device, an all-in-one computer, a smart home device and other device with communication functions, or a virtual machine, or a device simulated by a simulator.

Figure 3:
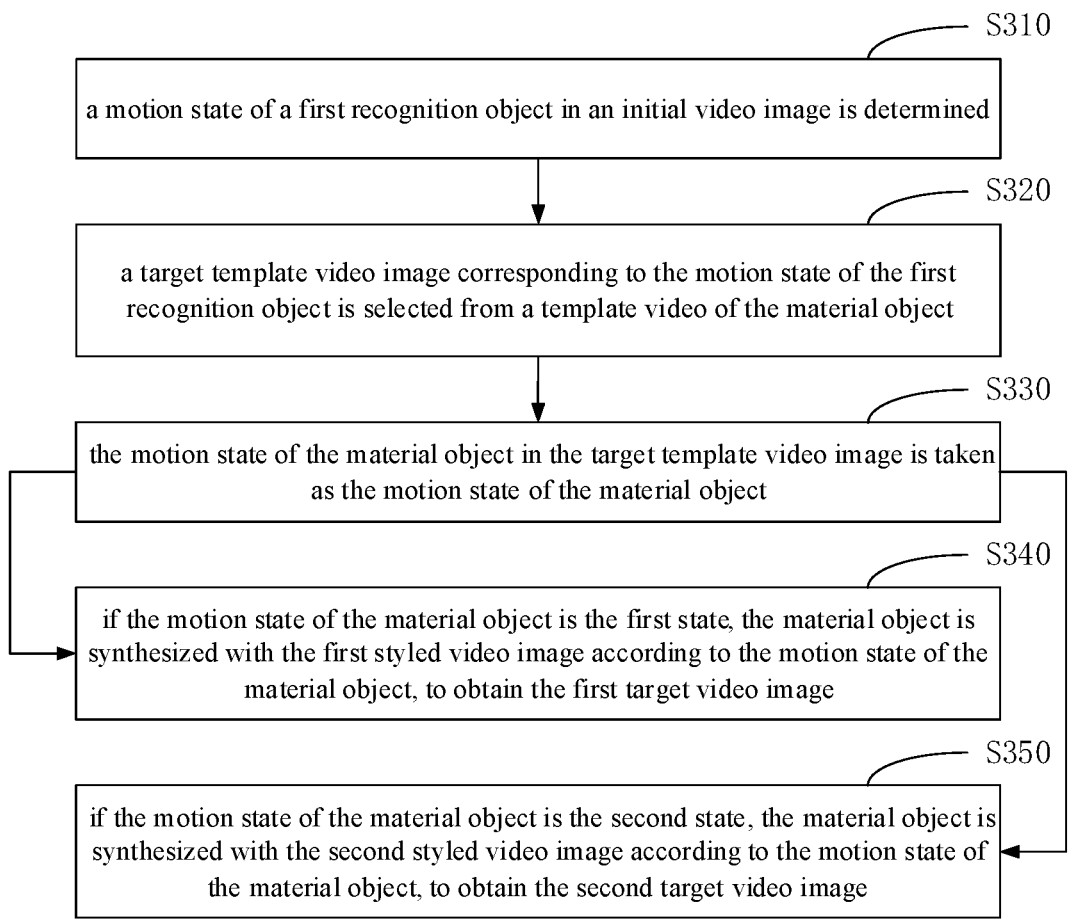
FIG. 3 is a flow diagram of an image processing method according to another embodiment of the present disclosure.

FIG. 3 is a flow diagram of an image processing method according to another embodiment of the present disclosure.

As shown in FIG. 3, the image processing method includes the following steps.

In step S310, a motion state of a first recognition object in an initial video image is determined.

Step S310 is similar to step S110 shown in FIG. 1, and will not be described here.

In step S320, a target template video image corresponding to the motion state of the first recognition object is selected from a template video of the material object.

In an embodiment of the present disclosure, after determining the motion state of the first recognition object, the electronic device may select the target template video image corresponding to the motion state of the first recognition object from multiple template video images in the template video of the material object.

In an embodiment, the step S320 may specifically include the following steps.

In step S321, a target frame quantity to be skipped corresponding to the motion state of the first recognition object is determined.

In some embodiments, if the motion state of the first recognition object is zero, the target frame quantity to be skipped is 0. If the motion state of the first recognition object is not zero, the target frame quantity to be skipped is 1.

In other embodiments, the electronic device may set a correspondence between the motion state and the frame quantity to be skipped in advance, and the frame quantity to be skipped may be proportional to the motion state, and then determine the target frame quantity to be skipped corresponding to the motion state of the first recognition object according to the correspondence.

In step S322, a target numbering of video frame corresponding to the motion state of the first recognition object is determined according to the target frame quantity to be skipped.

When the initial video image is the start frame in video, the numbering of the initial video frame may be frame 0.

When the initial video image is a non-start frame in video, the numbering of the initial video frame may be the numbering of video frame corresponding to the reference video image which is previous and adjacent to the initial video image.

Further, the electronic device may determine the target numbering of video frame corresponding to the motion state of the first recognition object according to the numbering of the initial video frame, the moving direction of the first recognition object namely the change direction of the display parameter variation of the first recognition object, and the target frame quantity to be skipped.

When the display parameter variation of the first recognition object is positive, the electronic device may plus the numbering of the initial video frame and the target frame quantity to be skipped to obtain the target numbering of video frame. When the display parameter variation of the first recognition object is negative, the electronic device may subtract the target frame quantity to be skipped from the numbering of the initial video frame to obtain the target numbering of video frame.

Further, when the target frame quantity to be skipped is negative, processing for the initial video image is stopped.

In step S323, the template video image corresponding to the target numbering of video frame in the template video of the material object is taken as the target template video image.

Therefore, in the embodiments of the present disclosure, the target template video image corresponding to the motion state of the first recognition object may be quickly and reliably selected.

In step S330, the motion state of the material object in the target template video image is taken as the motion state of the material object.

In an embodiment of the present disclosure, one template video image includes a material object with one motion state, that is, the motion state of the material object varies in different template video images, and the motion state of the material object in each template video image may be preset according to actual needs.

Therefore, the specific method for determining the motion state of the material object according to the motion state of the first recognition object may be implemented as: taking the motion state of the material object in the target template video image as the motion state of the material object.

In an embodiment, the step S330 may include:
taking the motion state of the material object at the target numbering of video frame as the motion state of the material object.

Since one template video image includes the material object with one motion state, the numbering of the video frame corresponding to the template video image may be used to indicate one motion state of the material object. That is, the numbering of the video frame corresponding to one template video image may be used to indicate the motion state of the material object in the corresponding template video image. Therefore, the electronic device may take the motion state of the material object under the target numbering of video frame as the motion state of the material object.

In and embodiment of the present disclosure, after determining the motion state of the material object, the electronic device may judge the motion state of the material object. If the motion state of the material object is the first state, step S340 is executed, and if the motion state of the material object is the second state, step S350 is executed.

In an embodiment, the electronic device may determine whether the motion state of the material object is the first state or the second state by judging the range to which the target numbering of video frame belongs.

Since the numbering of the video frame corresponding to one template video image may be used to indicate the motion state of the material object in the corresponding template video image, it is possible to determine a first numbering range of the template video image pair containing the material object in the first state and the second numbering range of the template video image pair containing the material object in the second state.

Specifically, the electronic device may determine the numbering range to which the target numbering of video frame belongs; determine that the motion state of the material object is the first state when it is determined that the target numbering of video frame belongs to the first numbering range; and determine that the motion state of the material object is the second state when it is determined that the target numbering of video frame belongs to the second numbering range.

In step S340, if the motion state of the material object is the first state, the material object is synthesized with the first styled video image according to the motion state of the material object, to obtain the first target video image.

In step S350, if the motion state of the material object is the second state, the material object is synthesized with the second styled video image according to the motion state of the material object, to obtain the second target video image.

The first styled video image and the second styled video image are images of different styles that are obtained on the basis of the initial video image.

Steps S340 to S250 are similar to steps S130 to S140 shown in FIG. 1, and will not be described here.

Therefore, in the embodiments of the present disclosure, it is possible to directly determine whether the motion state of the material object is the first state or the second state through the numbering of the video frame, without detecting the motion state of the material object, thereby reducing the amount of data processing, and thereby improving the efficiency of material editing.

In order to more clearly explain the image processing method provided by the embodiments of the present disclosure, the image processing process provided by the embodiments of the present disclosure is described in detail below, taking the case that the template video of the material object is a animation template video of a greeting card falling down, the material object is the greeting card, and the greeting card includes the special effect of movable greeting card frame and the special effect of non-movable greeting card bottom border as examples.

Figure 4:
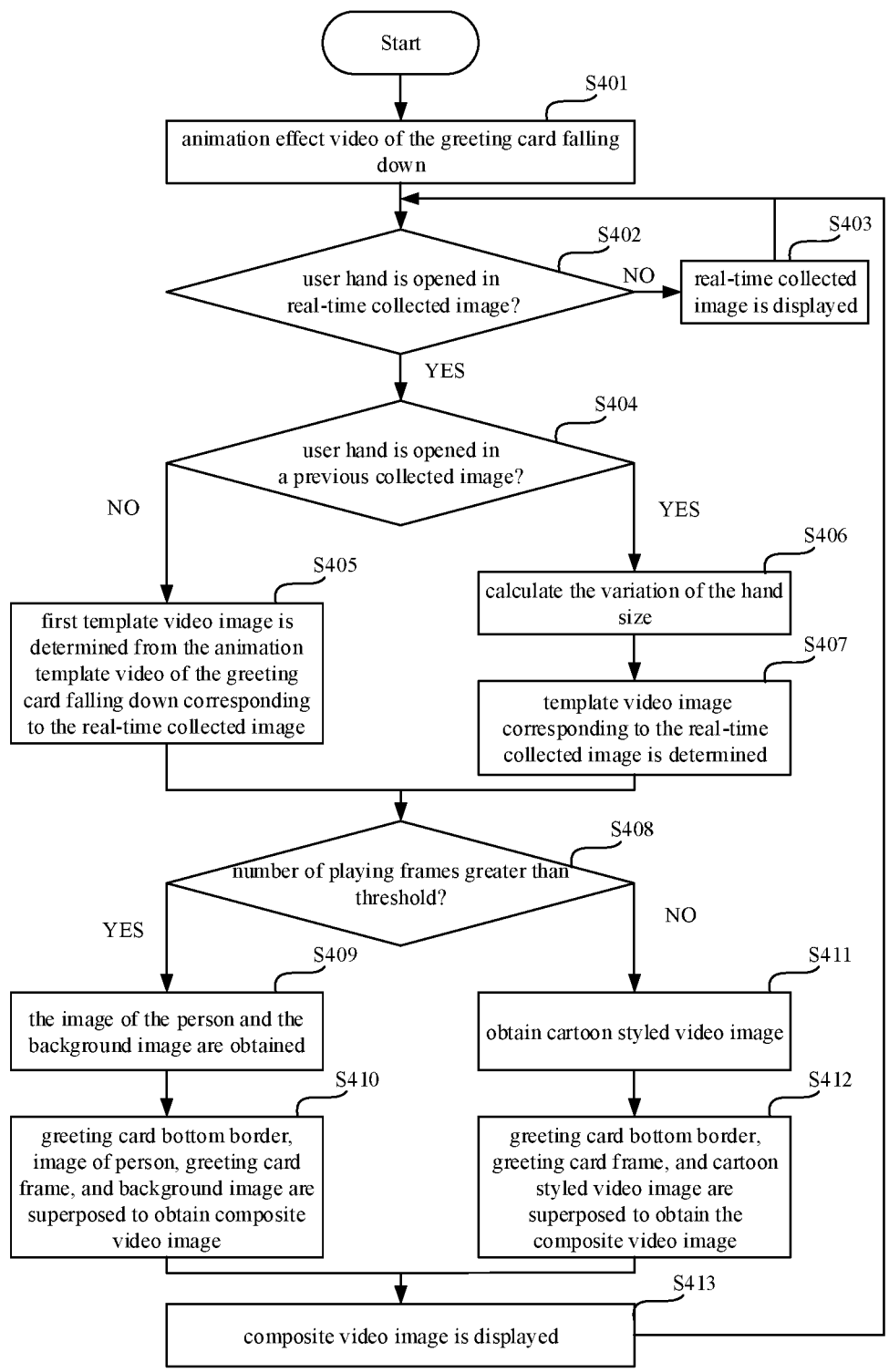
FIG. 4 is a flow diagram of an image processing process according to an embodiment of the present disclosure.

FIG. 4 is a flow diagram of an image processing process according to an embodiment of the present disclosure.

As shown in FIG. 4, the image processing process may include the following steps.

In step S401, the animation effect video of the greeting card falling down is played in a shooting preview screen. In the effect video, the effect control guidance information is displayed in each frame of the effect video. The effect control guidance information may be used to guide users to open their hands and move their palms forward and backward.

In the process of playing the animation effect video of the greeting card falling down, if the special effect of greeting card frame is the foreground of a person, the electronic device obtains the cartoon styled video image corresponding to the real-time captured image, and superposes the special effect of greeting card bottom border, the special effect of greeting card frame and cartoon styled video image from top to bottom to obtain the effect video image. If the special effect of greeting card frame is the background of a person, the real-time captured image will be divided into an image of the person and a background image, and the special effect of greeting card bottom border, the image of the person, the special effect of greeting card frame and the background image will be superposed from the top to the bottom to obtain the effect video image.

After the effect video is played, the following steps may be executed for each real-time image from step S402 until the electronic device stops collecting images.

In step S402, it is detected whether the user hand is opened in the real-time collected image. If not, step S403 is executed, and if yes, step S404 is executed.

The electronic device may detect the hand posture of the user in the real-time collected image. If the hand is in the open posture, step S404 is executed, otherwise step S403 is executed.

In step S403, the real-time collected image is displayed in the shooting preview screen, and the processing returns to step S402.

In step S404, it is determined whether the user hand is opened in a previous collected image. If not, step S405 is executed; otherwise, step S406 is executed.

The electronic device may obtain the detection result of the hand posture in the previous collected image, and determine whether the user's hand in the previous collected image is in open posture according to the detection result.

In step S405, the first template video image is determined from the animation template video of the greeting card falling down corresponding to the real-time collected image, and then step S408 is executed.

In step S406, the hand size in the real-time collected image is compared with the hand size in the previous collected image, to calculate the variation of the hand size, and then step S407 is executed.

In step S407, the template video image corresponding to the real-time collected image is determined according to the variation of the hand size, the variation of the hand size being positive or negative, and the numbering of the video frame corresponding to the previous collected image, and then step S408 is executed.

If the variation of the hand size is positive, it means that the hand pushes forward, and the electronic device may obtain the target frame quantity to be skipped corresponding to the variation of the hand size, and then add the numbering of the video frame corresponding to the previous collected image and the target frame quantity to be skipped, to determine the number of playing frames of the animation template video of the greeting card falling down, so as to obtain the special effect that the greeting card frame dumps backward in comparison with the previous collected image. Otherwise, the electronic device may subtract the target frame quantity to be skipped from the numbering of the video frame corresponding to the previous collected image to determine the number of playing frames of the animation template video of the greeting card falling down, so as to obtain the special effect that the greeting card frame stands forward in comparison with the previous collected image.

In step S408, it is determined whether the number of playing frames of the animation template video of the greeting card falling down is greater than a threshold. If yes, step S409 is executed, otherwise, step S411 is executed.

In step S409, image segmentation is performed on the real-time collected image to obtain the image of the person and the background image in the real-time collected image. Then step S410 is executed.

In step S410, the special effect of the greeting card bottom border, the image of the person, the special effect of the greeting card frame, and the background image are superposed from the top to the bottom to obtain a composite video image. Then step S413 is executed.

In step S411, cartoon stylization is performed on the real-time collected image to obtain cartoon styled video image. Then step S412 is executed.

In step S412, the special effect of the greeting card bottom border, the special effect of the greeting card frame, and the cartoon styled video image are superposed one by one to obtain the composite video image. Then step S413 is executed.

In step S413, the composite video image is displayed in the shooting preview screen.

Thus, with the image processing process shown in FIG. 4, the visual display of the special effect of the greeting card falling down or standing up through the face may be realized during the user's real-time video shooting, and the switching between the cartoon effect and the realistic effect may be realized during the process of the greeting card falling down or standing up. The interesting video with special effect may be automatically generated without the user's material editing on the captured video material, which increases the fun in interaction and improves user's experience.

The embodiments of the present disclosure further provide an image processing apparatus capable of implementing the above image processing method. The image processing apparatus provided by the embodiment of the present disclosure is described below with reference to FIG. 5.

In some embodiments of the present disclosure, the image processing apparatus may be an electronic device. The electronic devices may include a mobile phone, a tablet, a desktop, a laptop, an in-vehicle terminal, a wearable electronic device, an all-in-one computer, a smart home device and other device with communication functions, or a virtual machine, or a device simulated by a simulator.

Figure 5:
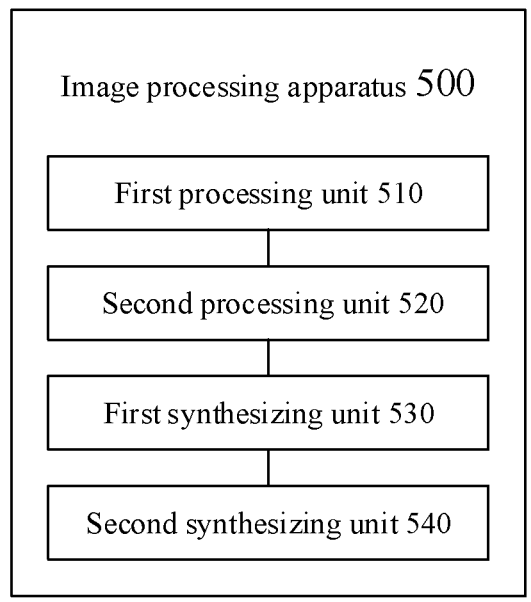
FIG. 5 is a structural diagram of an image processing apparatus according to an embodiment of the present disclosure.

FIG. 5 is a structural diagram of an image processing apparatus according to an embodiment of the present disclosure.

As shown in FIG. 5, the image processing apparatus 500 may include a first processing unit 510, a second processing unit 520, a first synthesizing unit 530, and a second synthesizing unit 540.

The first processing unit 510 is configured to determine a motion state of a first recognition object in an initial video image.

The second processing unit 520 is configured to determine a motion state of a material object according to the motion state of the first recognition object.

The first synthesizing unit is configured to, if the motion state of the material object is a first state, synthesize the material object with a first styled video image according to the motion state of the material object so as to obtain a first target video image.

The second synthesizing unit is configured to, if the motion state of the material object is a second state, synthesize the material object with a second styled video image according to the motion state of the material object so as to obtain a second target video image.

The first styled video image and the second styled video image are images of different styles that are obtained on the basis of the initial video image.

In the embodiments of the present disclosure, the motion state of the first recognition object in the initial video image is determined, the motion state of the material object is determined according to the motion state of the first recognition object, and then the motion state of the material object is to be judged. If the motion state of the material object is the first state, the material object is synthesized with the first styled video image according to the motion state of the material object to obtain the first target video image. If the motion state of the material object is the second state, the material object is synthesized with the second styled video image according to the motion state of the material object to obtain the second target video image. Therefore, the initial video image which is used as video material is automatically edited to obtain the edited composite image without manual material edit of users, thus reducing the time cost of video production, improving the quality of video works, and improving users' experience.

In some embodiments of the present disclosure, the first state indicates that the material object and the second recognition object in the initial video image meet the first position relationship, and the second state indicates that the material object and the second recognition object in the initial video image meet the second position relationship.

In some embodiments of the present disclosure, the first position relationship indicates that the material object is located in the foreground of the second recognition object, and the second positon relationship indicates that the material object is located in the background of the second recognition object.

In some embodiments of the present disclosure, the first styled video image is obtained by performing style migration on the initial video image, and the second styled video image is the initial video image.

In some embodiments of the present disclosure, the motion state of the first recognition object comprises any one of the following:
  a moving state of the first recognition object along a target moving direction;
  a posture change state of the first recognition object towards a target object posture; and
  a rotation state of the first recognition object along a target rotation direction.

In some embodiments of the present disclosure, the first processing unit 510 may include a first sub processing unit and a second sub processing unit.

The first sub processing unit is configured to detect a display parameter variation of the first recognition object in the initial video image.

The second sub processing unit is configured to determine the motion state of the first recognition object according to the display parameter variation.

In some embodiments of the present disclosure, the first processing unit 510 may further include a third processing unit, and the third sub processing unit is configured to detect an object posture of the first recognition object in the initial video image.

Accordingly, the first processing unit 510 is further configure to determine the motion state of the first recognition object in the initial video image in a case that the object posture of the first recognition object is a target posture.

In some embodiments of the present disclosure, the first processing unit 510 may further include a fourth processing unit, and the fourth sub processing unit is configured to select, in a template video of the material object, a target template video image corresponding to the motion state of the first recognition object.

Accordingly, the second processing unit 520 is further configured to taking a motion state of the material object in the target template video image as the motion state of the material object.

In some embodiments of the present disclosure, the fourth processing unit may include a third sub processing unit, the fourth sub processing unit and a fifth sub processing unit.

The third sub processing unit is configured to determine a target frame quantity to be skipped corresponding to the motion state of the first recognition object.

The fourth sub processing unit is configured to determine a target numbering of video frame corresponding to the motion state of the first recognition object according to the target frame quantity to be skipped.

The fifth sub processing unit is configured to take a template video image corresponding to the target numbering of video frame in the template video of the material object as the target template video image.

In some embodiments of the present disclosure, the second processing unit 520 is further configured to take a motion state of the material object at the target numbering of video frame as the motion state of the material object.

In some embodiments of the present disclosure, the material object includes a moving material object and a fixed material object, and the motion state of the material object is a motion state of the moving material object.

It should be noted that the image processing apparatus 500 shown in FIG. 5 may perform each step in the method embodiment shown in FIGS. 1 to 4, and realize each process and effect in the method embodiment shown in FIGS. 1 to 4, which will not be described here.

The embodiment of the present disclosure further provides an image processing device, which may include a processor and a memory, and the memory may be used to store executable instructions. The processor may be configured to read executable instructions from the memory and execute the executable instructions to implement the image processing method in the above embodiments.

Figure 6:
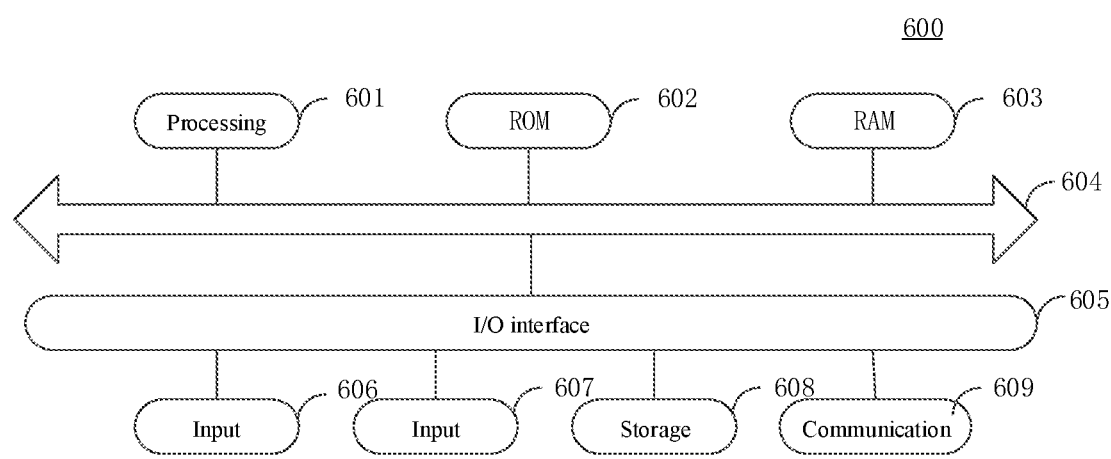
FIG. 6 is a structural diagram of an image processing device according to an embodiment of the present disclosure.

FIG. 6 is a structural diagram of an image processing device according to an embodiment of the present disclosure. The following is a specific reference to FIG. 6, which shows a structural diagram suitable for implementing the image processing device 600 in the embodiments of the present disclosure.

The image processing device 600 in the embodiment of the present disclosure may be an electronic device. The electronic device may include, but are not limited to, a mobile terminal such as a mobile phone, a laptop, a digital radio receivers, a personal digital assistant (PDA), a tablet computer (PAD), a portable multimedia player (PMP), a vehicle terminal (such as a vehicle navigation terminal), a wearable device, and the like, as well as a fixed terminals such as a digital TV, a desktop computer, a smart home device, and the like.

It should be noted that the image processing device 600 shown in FIG. 6 is only an example and should not impose any restrictions on the function and scope of use of the embodiments of the present disclosure.

As shown in FIG. 6, the image processing device 600 may include a processing apparatus 601 (such as a central processor, a graphics processor, etc.), which may perform various appropriate actions and processes according to a program stored in a read-only memory (ROM) 602 or a program loaded into a random access memory (RAM) 603 from the storage apparatus 608. In RAM 603, various programs and data required for the operation of the image processing device 600 are also stored. The processing apparatus 601, ROM 602, and RAM 603 are connected to each other via bus 604. The input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, and the like; an output apparatus 607 including, for example, a liquid crystal display (LCD), a loudspeaker, a vibrator, and the like; a storage apparatus 608 including, for example, a tape, a hard disk, and the like; and a communication apparatus 609. The communication apparatus 609 may allow the image processing device 600 to communicate wirelessly or wirelessly with other devices to exchange data. Although FIG. 6 shows the image processing device 600 with various devices, it should be understood that it is not required to implement or have all the devices shown, and more or fewer devices may be implemented alternatively.

The embodiments of the present disclosure further provide a computer-readable storage medium, which stores a computer program. When the computer program is executed by a processor, the processor enables the processor to implement the image processing method in the above embodiments.

In particular, according to the embodiment of the present disclosure, the process described above with reference to the flowchart may be implemented as a computer software program.

The embodiments of the present disclosure further provide a computer program product, which may include a computer program. When the computer program is executed by a processor, the processor enables the processor to implement the image processing method in the above embodiments.

For example, embodiments of the present disclosure include a computer program product, which includes a computer program carried on a non-transient computer-readable medium, and the computer program includes program codes for executing the method shown in a flowchart. In such an embodiment, the computer program may be downloaded and installed from the network through the communication apparatus 609, or installed from the storage apparatus 608, or installed from the ROM 602. When the computer program is executed by the processing apparatus 601, the above functions defined in the image processing method of the embodiment of the present disclosure are executed.

It should be noted that the computer-readable medium described in the embodiments of the present disclosure may be a computer-readable signal medium, a computer-readable storage medium, or any combination of the two. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: electrical connections with one or more wires, portable computer disks, hard disks, random access memories (RAM), read-only memories (ROM), erasable programmable read-only memories (EPROM or flash memory), optical fibers, portable compact disk read-only memories (CD-ROM), optical storage devices, magnetic storage devices or any suitable combination of the above. In the embodiment of the present disclosure, the computer-readable storage medium may be any tangible medium containing or storing a program, which may be used by or in combination with an instruction execution system, apparatus or device. In the embodiment of the present disclosure, the computer-readable signal medium may include data signals that are propagated in the baseband or as part of the carrier, and carry computer-readable program code. Such transmitted data signals may take various forms, including but not limited to electromagnetic signals, optical signals or any suitable combination of the above. The computer-readable signal medium may be any computer-readable medium other than a computer-readable storage medium, which may transmit, propagate, or transmit programs for use by or in combination with an instruction execution system, apparatus, or device. The program code contained on the computer readable medium may be transmitted with any appropriate medium, including but not limited to: wire, optical cable, radio frequency (RF), etc., or any appropriate combination of the above.

In some embodiments, the client may communicate using any currently known or future developed network protocol, such as HyperText Transfer Protocol (HTTP), and may be interconnected with digital data communication (e.g., communication network) in any form or medium. Examples of communication networks include local area networks ("LAN"), wide area networks ("WAN"), the Internet (for example, the Internet), and end-to-end networks (for example, ad hoc end-to-end networks), as well as any currently known or future developed networks.

The computer-readable medium may be included in the electronic device, and the computer-readable medium may exist independently without being assembled into the electronic device.

The computer-readable medium carries one or more programs. When the one or more programs are executed by the electronic device, cause the electronic device to:

determine a motion state of a first recognition object in an initial video image; determine a motion state of a material object according to the motion state of the first recognition object; if the motion state of the material object is a first state, synthesize the material object with a first styled video image according to the motion state of the material object so as to obtain a first target video image; and if the motion state of the material object is a second state, synthesize the material object with a second styled video image according to the motion state of the material object so as to obtain a second target video image. The first styled video image and the second styled video image are images of different styles that are obtained on the basis of the initial video image.

In the embodiments of the present disclosure, computer program code for performing the operations of the embodiments of the present disclosure may be written in one or more programming languages or a combination thereof. The programming languages include, but are not limited to, object-oriented programming languages such as Java, Smalltalk, C++, and conventional procedural programming languages such as "C" or similar programming languages. The program code can be executed completely on the user computer, partially on the user computer, as an independent software package, partially on the user computer, partially on the remote computer, or completely on the remote computer or server. In the case involving a remote computer, the remote computer may be connected to the user computer through any kind of network, including a local area network (LAN) or a wide area network (WAN), or may be connected to an external computer (for example, using an Internet service provider to connect via the Internet).

The flowchart and block diagram in the accompanying drawings illustrate the possible architectures, functions and operations of the systems, methods and computer program products according to various embodiments of the present disclosure. In this regard, each block in a flowchart or block diagram may represent a module, program segment, or part of a code that contains one or more executable instructions for implementing a specified logical function. It should also be noted that in some alternative implementations, the functions marked in the block may occur in a different order from those marked in the drawings. For example, two consecutive boxes may actually be executed basically in parallel, or they may sometimes be executed in reverse order, depending on the function involved. It should also be noted that each block in the block diagram and/or flow diagram, and the combination of the blocks in the block diagram and/or flow diagram, may be implemented with a dedicated hardware based system that performs a specified function or operation, or may be implemented with a combination of dedicated hardware and computer instructions.

The modules described in the embodiments of the present disclosure may be realized by software or hardware. The name of the module does not constitute the limitation of the module itself in some cases.

The functions described above herein may be performed at least partially by one or more hardware logical units. For example, without limitation, exemplary types of hardware logic components that may be used include: field programmable gate array (FPGA), application specific integrated circuit (ASIC), application specific standard product (ASSP), system on chip (SOC), complex programmable logic device (CPLD), and so on.

In the context of embodiments of the present disclosure, a machine-readable medium may be a tangible medium, which may contain or store programs for use by or in combination with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatus, or devices, or any suitable combination of the foregoing. A more specific example of a machine-readable storage medium would include an electrical connection based on one or more lines, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The above description is only a preferred embodiment of the present disclosure and an explanation of the applied technical principles. Those skilled in the art should understand that the disclosure scope involved in the embodiments of the present disclosure is not limited to the technical solutions formed by the specific combination of the above technical features, but also covers other technical solutions formed by the arbitrary combination of the above technical features or their equivalent features without departing from the above disclosure concept. For example, the technical solution formed by replacing the above features with (but not limited to) the technical features with similar functions disclosed in the embodiments of the present disclosure.

Furthermore, although the operations are described in a particular order, this should not be understood as requiring the operations to be performed in the particular order shown or in a sequential order. Under certain circumstances, multitasking and parallel processing may be beneficial. Similarly, although the above discussion includes a number of specific implementation details, these should not be interpreted as limiting the scope of the embodiments of the present disclosure. Certain features described in the context of separate embodiments may be implemented in a single embodiment in combination. Conversely, various features described in the context of a single embodiment may be implemented in multiple embodiments individually or in any suitable sub combination.

Although the subject matter has been described in terms specific to the structural features and/or method logic actions, it should be understood that the subject matter defined in the appended claims is not necessarily limited to the specific features or actions described above. On the contrary, the specific features and actions described above are only examples of realizing the claims.

The invention claimed is:

1. An image processing method, comprising:
    determining an amount of motion of a first recognition object in an initial video image;
    determining a motion state of an effect object according to the amount of motion of the first recognition object, wherein the effect object is an object different from the first recognition object;
    if the motion state of the effect object is a first state, synthesizing the effect object with a first styled video image according to the motion state of the effect object, so as to obtain a first target video image; and
    if the motion state of the effect object is a second state, synthesizing the effect object with a second styled video image according to the motion state of the effect object, so as to obtain a second target video image;
    wherein the first styled video image and the second styled video image are images of different styles that are obtained on the basis of the initial video image,
    wherein before the determining the motion state of the effect object according to the amount of motion of the first recognition object, the method further comprises:
    selecting, in a template video of the effect object, a target template video image corresponding to the amount of motion of the first recognition object;
    wherein the determining the motion state of the effect object according to the amount of motion of the first recognition object comprises:
    taking a motion state of the effect object in the target template video image as the motion state of the effect object.

2. The method according to claim 1, wherein the first state indicates that the effect object and a second recognition object in the initial video image meet a first position relationship, and the second state indicates that the effect object and the second recognition object in the initial video image meet a second position relationship.

3. The method according to claim 2, wherein the first position relationship indicates that the effect object is located in a foreground of the second recognition object, and the second position relationship indicates that the effect object is located in a background of the second recognition object.

4. The method according to claim 1, wherein the first styled video image is obtained by performing style migration on the initial video image, and the second styled video image is the initial video image.

5. The method according to claim 1, wherein the amount of motion of the first recognition object comprises any one of the following:
    an amount of movement of the first recognition object along a target moving direction;
    an amount of a posture change of the first recognition object towards a target posture; and
    a rotation amount of the first recognition object along a target rotation direction.

6. The method according to claim 1, wherein the determining the amount of motion of the first recognition object in the initial video image comprises:
   detecting a display parameter variation of the first recognition object in the initial video image; and
   determining the amount of motion of the first recognition object according to the display parameter variation.

7. The method according to claim 1, wherein the selecting, in the template video of the effect object, the target template video image corresponding to the amount of motion of the first recognition object comprises:
   determining a target frame quantity to be skipped corresponding to the amount of motion of the first recognition object;
   determining a target numbering of video frame corresponding to the amount of motion of the first recognition object according to the target frame quantity to be skipped; and
   taking a template video image corresponding to the target numbering of video frame in the template video of the effect object as the target template video image.

8. The method according to claim 7, wherein the taking the motion state of the effect object in the target template video image as the motion state of the effect object comprises:
   taking a motion state of the effect object at the target numbering of video frame as the motion state of the effect object.

9. The method according to claim 1, wherein the effect object comprises a moving effect object and a fixed effect object, and the motion state of the effect object is a motion state of the moving effect object.

10. The method according to claim 1, wherein before the determining the amount of motion of the first recognition object in the initial video image, the method further comprises:
   detecting an object posture of the first recognition object in the initial video image;
   wherein the determining the amount of motion of the first recognition object in the initial video image comprises:
   determining the amount of motion of the first recognition object in the initial video image in a case that the object posture of the first recognition object is a target posture.

11. An image processing device, comprising:
   a processor; and
   a memory for storing executable instructions;
   wherein the processor is configured to read the executable instructions from the memory and execute the executable instructions to implement:
   determining an amount of motion of a first recognition object in an initial video image;
   determining a motion state of an effect object according to the amount of motion of the first recognition object, wherein the effect object is an object different from the first recognition object;
   if the motion state of the effect object is a first state, synthesizing the effect object with a first styled video image according to the motion state of the effect object, so as to obtain a first target video image; and
   if the motion state of the effect object is a second state, synthesizing the effect object with a second styled video image according to the motion state of the effect object, so as to obtain a second target video image;
   wherein the first styled video image and the second styled video image are images of different styles that are obtained on the basis of the initial video image,
   wherein the processor is further configured for: before the determining the motion state of the effect object according to the amount of motion of the first recognition object,
   selecting, in a template video of the effect object, a target template video image corresponding to the amount of motion of the first recognition object; and
   taking a motion state of the effect object in the target template video image as the motion state of the effect object.

12. The image processing device according to claim 11, wherein the first state indicates that the effect object and a second recognition object in the initial video image meet a first position relationship, and the second state indicates that the effect object and the second recognition object in the initial video image meet a second position relationship.

13. The image processing device according to claim 12, wherein the first position relationship indicates that the effect object is located in a foreground of the second recognition object, and the second position relationship indicates that the effect object is located in a background of the second recognition object.

14. The image processing device according to claim 11, wherein the first styled video image is obtained by performing style migration on the initial video image, and the second styled video image is the initial video image.

15. The image processing device according to claim 11, wherein the amount of motion of the first recognition object comprises any one of the following:
   an amount of movement of the first recognition object along a target moving direction;
   an amount of a posture change of the first recognition object towards a target posture; and
   a rotation amount of the first recognition object along a target rotation direction.

16. The image processing device according to claim 11, wherein the processor is further configured for:
   detecting a display parameter variation of the first recognition object in the initial video image; and
   determining the amount of motion of the first recognition object according to the display parameter variation.

17. The image processing device according to claim 11, wherein the processor is further configured for:
   detecting an object posture of the first recognition object in the initial video image; and
   determining the amount of motion of the first recognition object in the initial video image in a case that the object posture of the first recognition object is a target posture.

18. A non-transitory computer-readable storage medium having a computer program stored thereon, wherein the computer program, when being executed by a processor, cause the processor to implement:
   determining an amount of motion of a first recognition object in an initial video image;
   determining a motion state of an effect object according to the amount of motion of the first recognition object, wherein the effect object is an object different from the first recognition object;
   if the motion state of the effect object is a first state, synthesizing the effect object with a first styled video image according to the motion state of the effect object, so as to obtain a first target video image; and
   if the motion state of the effect object is a second state, synthesizing the effect object with a second styled video image according to the motion state of the effect object, so as to obtain a second target video image;

wherein the first styled video image and the second styled video image are images of different styles that are obtained on the basis of the initial video image, wherein the computer program further cause the processor to implement: before the determining the motion state of the effect object according to the amount of motion of the first recognition object, selecting, in a template video of the effect object, a target template video image corresponding to the amount of motion of the first recognition object; and taking a motion state of the effect object in the target template video image as the motion state of the effect object.

* * * * *